May 15, 1928. 1,669,930
J. R. DOSTAL
BOTTLE HANDLING MACHINE
Filed Dec. 1, 1925   4 Sheets-Sheet 3
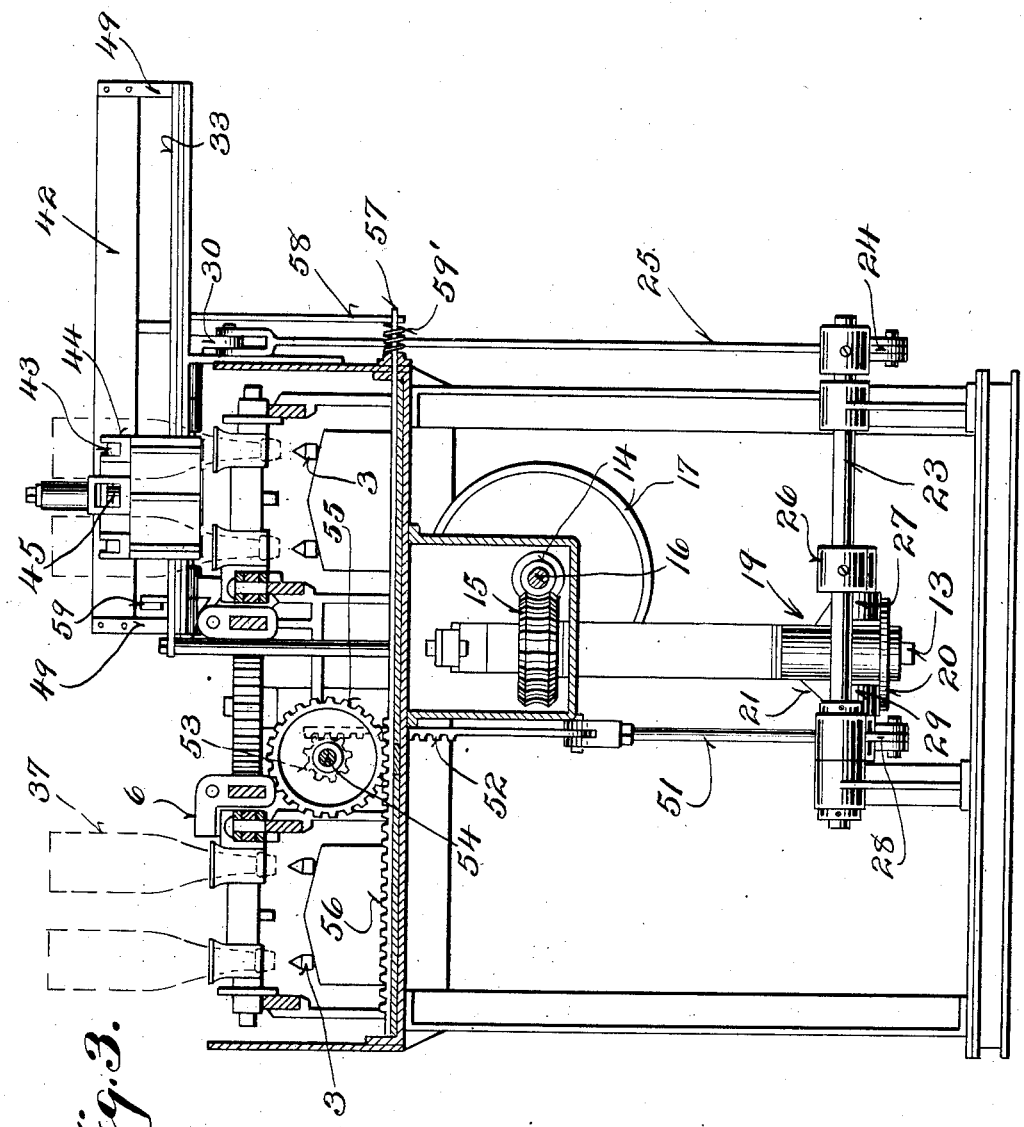

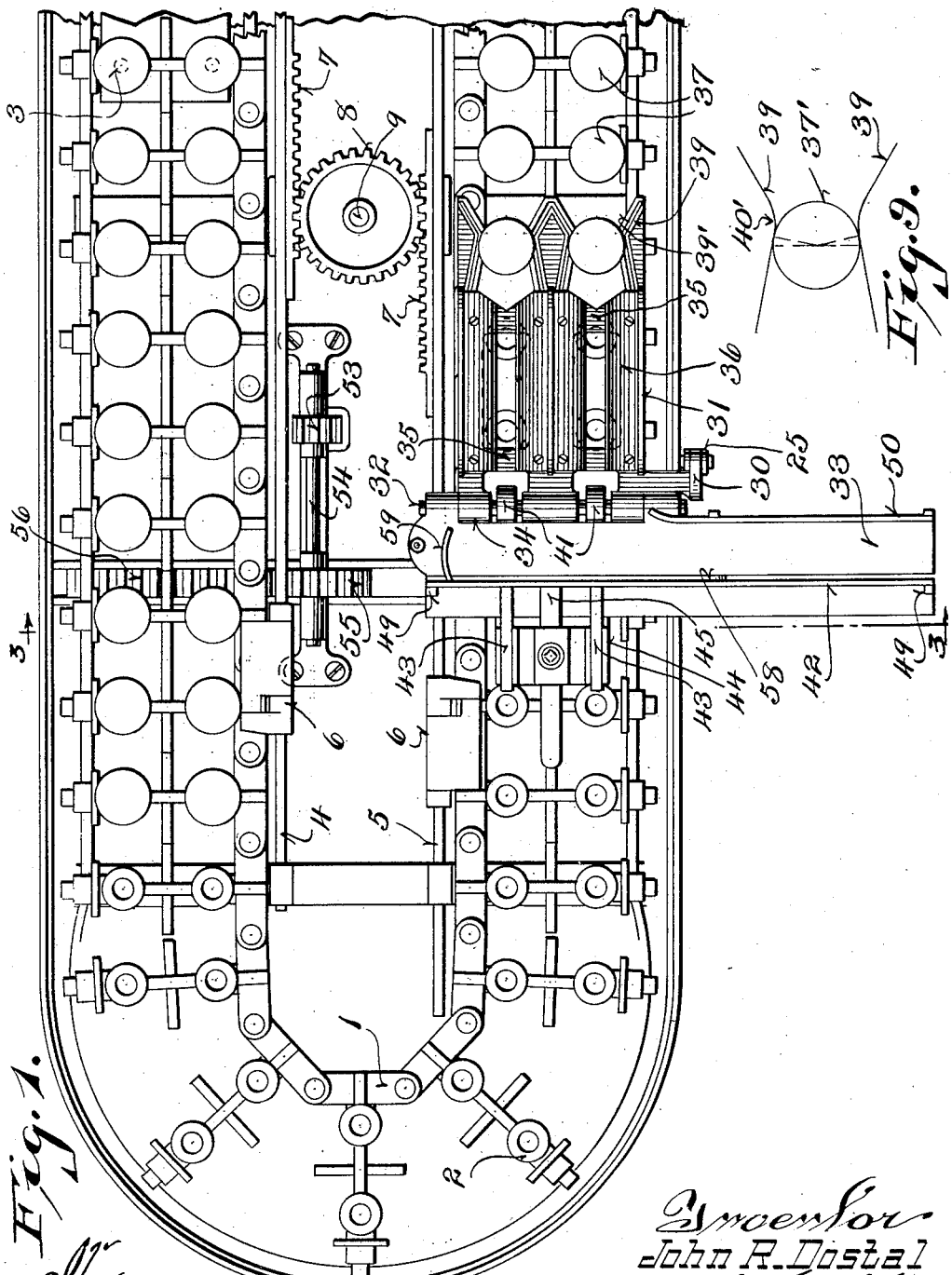

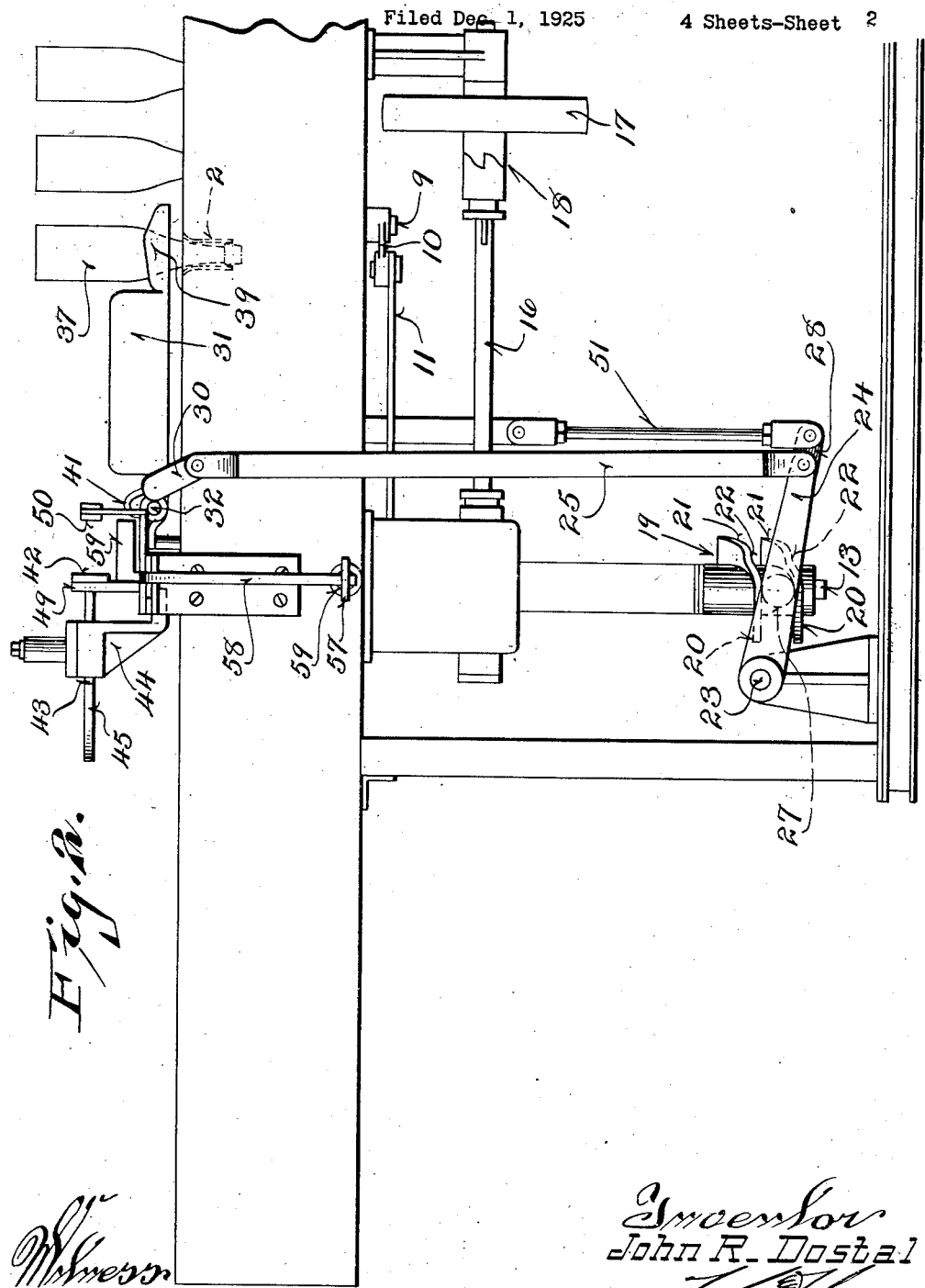

May 15, 1928.　　　　　　　　　　　　　　　　　1,669,930
J. R. DOSTAL
BOTTLE HANDLING MACHINE
Filed Dec. 1, 1925　　　　4 Sheets-Sheet 4
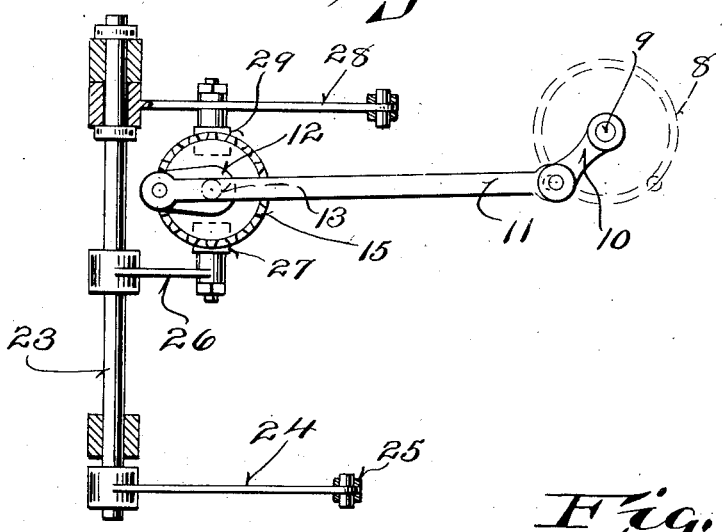
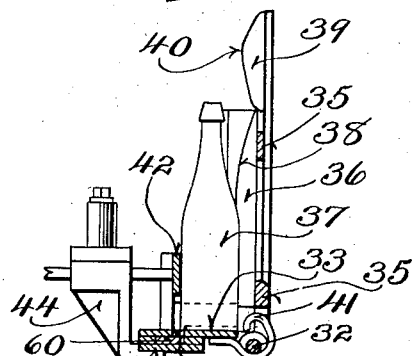
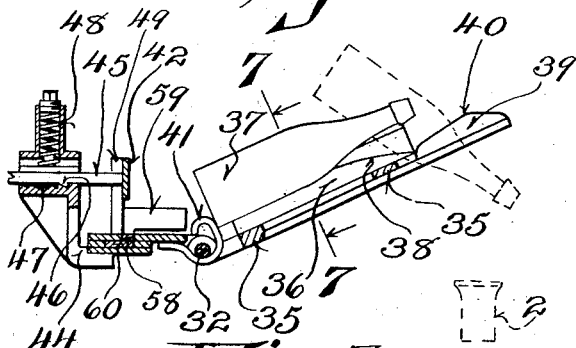
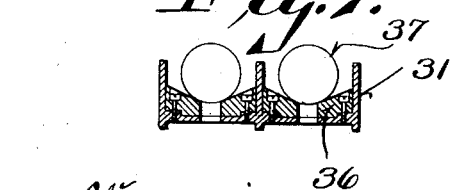
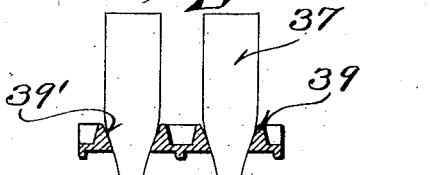
Inventor
John R. Dostal Patented May 15, 1928.

1,669,930

UNITED STATES PATENT OFFICE.

JOHN R. DOSTAL, OF MILWAUKEE, WISCONSIN, ASSIGNOR TO DOSTAL & LOWEY HYDRO COMPANY, OF MILWAUKEE, WISCONSIN, A CORPORATION OF WISCONSIN.

BOTTLE-HANDLING MACHINE.

Application filed December 1, 1925. Serial No. 72,512.

This invention relates to bottle handling machines, and is particularly directed to a bottle washing machine.

In general, this invention is an improvement over the inventions disclosed in my prior applications for bottle washing machines No. 668,352, filed October 13, 1923, and No. 751,938, filed November 24, 1924.

In bottle washing machines of the type disclosed in this application and in my prior applications, it is the usual practice to provide a conveyor for carrying the bottles through the washing mechanism and when the conveyor has approximately completed its travel through one cycle the bottles have heretofore been manually removed from the conveyor.

This invention is designed to overcome the necessity for the manual removal of bottles from the conveyor, particularly of bottle washing machines, and objects of such invention are to provide means for automatically receiving and removing the bottles from the conveyor and placing the removed bottles upon a table from which they may slide on to any suitable device such as a traveling belt or other conveyor.

Further objects are to provide a bottle handling machine which in no way interferes with the action of the main machine with which it cooperates but which will act in complete harmony with such machine without requiring any alteration of the mechanism of the main bottle washing machine.

More specifically, objects of this invention are to provide a bottle handling machine which will lift the inverted bottles from the bottle washing machine and stand them upright upon their bases and deliver them laterally from the bottle washing machine in a regular and orderly manner.

Further objects are to provide means for correctly aligning the upright bottles as they are being removed from the bottle washing machine, and to provide a yielding mechanism for aligning the bottles so that irregularities in the diameter or size of the bottles will not result in crushing the bottles.

An embodiment of the invention is shown in the accompanying drawings, in which:—

Figure 1 is a fragmentary plan view of a bottle washing machine having associated therewith the bottle handling device.

Figure 2 is a side elevation of the structure shown in Figure 1.

Figure 3 is a transverse sectional view through the machine, said section being taken approximately on the line 3—3 of Figure 1, with certain other portions of the machine shown in section for clearness of illustration.

Figure 4 is a detail of certain of the driving or operating parts of the machine.

Figure 5 is a view partly in section showing the bottle elevating mechanism in one position.

Figure 6 is a corresponding view showing the bottle elevating mechanism in its final position.

Figure 7 is a transverse sectional view through the bottle elevating arms or fingers, such view corresponding to a section on the line 7—7 of Figure 5.

Figure 8 is a sectional view through the bottle elevating fingers, such view being a section adjacent the outer ends of the fingers.

Figure 9 is an enlarged schematic view of the neck of a bottle and the associated fingers.

Referring to the drawings, particularly Figure 1, it will be seen that the bottle washing machine comprises an endless conveyor 1 whose major portion travels in a pair of parallel lines, as disclosed in detail in my copending applications above noted. This conveyor makes a half turn at each end of the machine. It is composed of a plurality of individual links each of which is provided, in the form shown, with a pair of bottle receiving collars or holders 2 which are adapted to receive the necks of the bottles. The links are guided by suitable tracks, as described in greater detail in my above noted applications. This conveyor is given a step by step motion with a period of dwell with the bottles over the bottle washing nozzles, such for instance as indicated by the reference characters 3 in Figures 1 and 3. This step by step motion is imparted to the conveyor by means of a pair of parallel reciprocatory rods 4 and 5 which lie closely adjacent and inside of the straight stretches of the conveyor. Attention is particularly directed to Figures 1 and 3. These rods 4 and 5 are each provided with dogs 6 which engage the links by contacting with projections carried thereon. The reciprocatory motion is imparted to the bars 4 and 5 by means of racks 7 secured to such bars and cooperating with an oscillatory pinion 8. This pinion is carried by a vertical shaft 9 which extends downwardly through the machine and is provided with a rock arm 10 (see Figure 4) adjacent its lower end. This rock arm is connected by means of a pitman 11 with a crank 12 carried by a vertical shaft 13. The shaft 13 is driven by means of the worm and worm wheel 14 and 15, respectively, such worm being secured to the horizontal shaft 16 (see Figures 2 and 3). This horizontal shaft 16 is driven in any suitable manner as by means of the pulley 17 whose operative connection of the shaft is controlled by means of a clutch 18.

It is to be noted particularly from Figures 2 and 3, that the vertical shaft 13 carries a cam which has a pair of spaced flanges forming a slot between them to receive the cam rollers. This cam is indicated generally by the reference character 19 and is provided on one side with a flat portion 20 formed by correspondingly shaping the flanges. On the opposite sides it is provided with an upwardly slanting portion 21, as shown most clearly in Figure 2. It is to be noted also that this upwardly slanting portion is provided with short substantially flat portions 22 so as to give a short period of dwell during the rising motion of the cam rollers while the portion 20 gives a long period of dwell while the cam rollers are in their lowest positions.

A horizontal shaft 23 is mounted adjacent the cam, as shown in Figures 2 and 3, and is provided with a lever 24 rigidly secured thereto. This lever 24 is connected to a vertical pitman or link 25. Further, the shaft is provided with a short lever 26 (see Figures 3 and 4). This lever 26 is also rigidly secured to the shaft 23 and it carries at its outer end a cam roller 27 which cooperates with the cam and travels in the groove or slot between the flanges. Thus when the arm 26 is operated, the arm 24 and pitman 25 are correspondingly moved.

A third lever 28 is loosely mounted upon the shaft 23. This lever is also provided with a cam roller 29 which cooperates with the cam on the side opposite the cam roller 27 so that when one roller is elevated, the other roller is depressed and is allowed to dwell in its lowest position.

The lever 28 through suitable mechanism operates a finger 59 to push the bottles along a table 33 as will appear hereinafter. The pitman 25 extends upwardly and is connected to an arm 30 which is rigidly carried by the bottle elevating fingers or frame 31 (see Figures 1 and 2). This bottle elevating frame is carried by a transverse pin 32 which passes through suitable supports carried by a stationary table 33 and through lugs 34 formed on the bottle elevating frame, so that the bottle elevating frame is pivoted about the pin 32 and is adapted to be rocked upwardly by means of the pitman 35. This bottle elevating frame is shown in section in Figure 7 and it will be seen that it is a metal member of box-like formation with open slots along its bottom. It is provided with transverse members or bracing arms 35 adjacent its forward and rear ends. This frame carries inwardly tapered wooden blocks 36, as most clearly shown in Figures 1 and 7, and these blocks are arranged in pairs and slant inwardly, as shown in Figure 7 so as to provide a channel or support for the bottles 37. The forward end of the wooden blocks 36 are rounded, as indicated at 38 in Figures 5 and 6, to provide a free space for the shoulders of the bottles during the period when they are tipping, as will appear hereinafter.

The frame 31 carries forwardly projecting fingers or arms 39 (see Figures 1, 5, 6 and 8). These arms or fingers 39 form continuations of the fingers or wooden blocks 36 so that the bottle lifting frame, as a whole, provides two pairs of forwardly extending fingers for the particular machine illustrated. The portions 39 have diverging outer ends which are contracted to the point indicated at 40' in Figure 9. From this point they again diverge as they extend rearwardly.

The purpose of this construction will appear from a consideration of Figure 9 where the bottle necks 37' are shown very much enlarged and in the position in which they are placed by the conveyor just prior to the beginning of the elevating movement of the fingers or bottle elevating frame. It will be seen that the central line of the bottles is spaced rearwardly of the point at which the bottles contact with the fingers 39 due to the contracted and slanting arrangement of the fingers. In other words, the bottles are supported by the fingers slightly in advance of their center line, as clearly shown in Figure 9. When the fingers rise, the bottles have a tendency to tip rearwardly due to the particular points at which the fingers engage the necks, as has been developed in Figure 9. This action is added due to the fact that the fingers 39 also slant upwardly to adjacent the point 40, as shown in Figures 5 and 6, and thus the bottles are supported slightly rearwardly of this point, that is to say, on the downwardly slanting side of the fingers 39. This also aids in the rearward tipping of the bottles.

The purpose of the intermediate dwell 22 of the cam (see Figure 2) will now appear. When the cam operates the bottle elevating fingers or frame, it is first raised upwardly to the position shown in Figure 5. At this point the roller 27 engages the flat portions 22 and causes the fingers to dwell for a short interval in the position shown in Figure 5. This allows the bottles to rock rearwardly and to slide into their full line position, as shown in Figure 5. They rock over against the wooden fingers 36 and slide downwardly until their bases engage the bumpers 41. Thereafter, the bottle elevating fingers complete their elevating motion and arrive at their vertical position, as shown in Figure 6, thus sliding the bottle off the bumpers and depositing it upon the table 33 in an upright position. In order to align the bottles in their upright positions upon the table 33, a back plate or aligning bar 42 is provided, as shown in Figures 1, 2, 5 and 6. This aligning bar 42 contacts with the bottles and places them in a perfect line upon the table.

It is to be noted that the aligning bar is provided with guiding rods or bars 43 (see Figures 1 and 3), such bars sliding in slots formed in a guiding frame 44 secured to the machine. The aligning bar 42 also carries a relatively larger rearwardly extending bar 45 which is positioned centrally between the guides 43. This bar 45 also slides through the frame 44. However, it is constructed differently from the bars 43, as may be seen from Figure 5. This bar 45 is provided with a single tooth 46 which is rearwardly slanting and has an abrupt front face. It is adapted to seat in any one of the notches 47, as shown in Figure 5, and is urged downwardly by means of the spring 48. However, if a bottle slightly larger than the average is presented by the elevating fingers, it is not wedged between such fingers and a stationary portion of the machine but, instead, strikes the yieldingly carried aligning bar 42. This bar will slide rearwardly due to the tooth and notch construction as above described, and will prevent crushing of this unusually large bottle. If desired, the aligning bar 42 may be provided with feet or supports 49 adjacent its ends and such feet may ride upon the table to aid in properly supporting the bar, as shown in Figures 1, 3 and 5.

It is to be noted further from Figure 1 that the table is provided with a forward guiding rail 50 which has a slightly outwardly turned inner end. The bottles are adapted to be received between the guiding bar 42 and the rail 50 when they are moved laterally upon the table by means of the mechanism hereinafter described.

It is to be particularly noted that the fingers 39 are provided with a relatively sharp slanting surface adjacent their bottom sides and with a more gradually slanting surface as the upper portions of the fingers are approached. This is brought out by the parallel lines in Figure 1 and also is shown in Figure 8, and indicated by the reference character 39'. This construction facilitates the proper engagement of the necks of the bottles of various sized shoulders or body, the most tapered or most gradually slanting neck being engaged, as shown in Figure 8, and the more abrupt shoulders being engaged adjacent the upper portion of the slanting faces 39' of the fingers 39.

The means for actuating the lateral shifting devices for the bottles is operated by means of the lever 28 (see Figures 3 and 4). This lever 28 is connected by means of a pitman 51 with a rack bar 52. The rack engages a pinion 53 which is rigid upon a horizontal shaft 54 (see Figures 1 and 3). This shaft also carries a gear 55 which meshes with a horizontal rack 56 carried by a horizontal bar 57. This horizontal bar 57 extends outwardly beyond the edge of the machine, as shown in Figure 3, and joins a vertical bar 58. If desired, a spring 59' may be positioned about the bar 57 to cushion its final inward motion.

From the mechanism thus far described, it will be seen that when the lever 28 rocks upwardly, it will rock the rack bar 52 upwardly, consequently rotating the gear wheels and moving the horizontal bar 57 outwardly. This outward motion is transmitted to the vertical bar or arm 58, which, as may be seen from Figure 1, has a rearwardly extending portion. This rearwardly extending portion carries a curved finger 59 which engages the bottles when the bar 58 is moved outwardly, and thus slides the bottles along the table. It is to be noted that the bar 58, as most clearly shown in Figures 5 and 6, is provided with a foot 60 which is positioned below the table top and is guided in an undercut slot formed by the members 61 secured to the under side of the table. In this way, a proper support is provided for the inner end of the bar 58 adjacent the finger 59.

The operation of the machine is as follows:—The bottles are fed by the conveyor in a step by step motion past the washing means and a period of dwell is allowed the bottles over the spray nozzles, as described in greater detail in my above noted applications. During this advancing motion of the bottles, a pair of bottles is moved between the fingers 39 (see Figure 1). Thereafter, the conveyor is allowed to dwell and the fingers are tilted upwardly, thus withdrawing the bottles from the cups or holders 2 of the conveyor and allowing them to rock into position. Continued motion of the fingers seats the bottles upon the table top in an upright position. This elevating motion of the fingers is secured by means of the cam 19 (see Figures 2 and 3). Obviously, while the lever 24 is operating, the lever 28 (see Figure 4) is idle as its cam roller is diametrically opposite the cam roller of the lever 26. However, when the lever 26 has returned to its lowest position, the lever 28 operates and, through the rack and pinion mechanism described above, causes the finger 59 (see Figure 1) to move laterally of the machine and to slide the upright bottles laterally of the machine along the table 33 into position between the guide rail 50 and the guiding or aligning bar 42.

This cycle of operations is repeated, and the bottles may be discharged from the outermost end of the table 33 upon any suitable type of apparatus such as a conveyor for instance.

It will be seen further that a very effective automatic bottle handling mechanism has been provided which, although eminently adapted for use in bottle washing machines may, nevertheless, be used in other capacities.

Further, it will be noted that the aligning back stop will yield under unusual conditions due to defectively shaped bottles and thus crushing of the bottles is wholly avoided. Thus, it will be seen that a bottle handling machine has been provided which will handle the bottles without any danger whatsoever to the bottles, and it will be seen further that the machine is wholly automatic in its operation.

Although the invention has been described in considerable detail, it is to be understood that the invention may be variously embodied and is, therefore, to be limited only as claimed.

I claim:

1. The combination of a bottle washing machine having a conveyor for holding the bottles in an inverted position and for advancing said bottles, and means for removing the bottles from said conveyor, said means including mechanism for engaging the bottles while in an inverted position and turning them into upright position, and mechanism for sliding the upright bottles laterally from said machine.

2. The combination of a bottle washing machine having a conveyor for holding the bottles in an inverted position and for advancing said bottles, and means for removing the bottles from said conveyor, said means including mechanism for engaging the bottles while in an inverted position and turning them into upright position, and mechanism for sliding the upright bottles laterally from said machine, the mechanism for elevating the bottles and for sliding such bottles from the machine operating alternately.

3. In a machine for operating upon bottles, the combination of a conveyor having holders for the necks of the bottles, fingers for engaging the necks of the bottles and lifting them from the holders and turning the lifted bottles into upright position, and laterally reciprocating fingers for sliding the upright bottles from the machine.

4. In a machine for handling bottles, the combination of a conveyor for holding the bottles in an inverted position and advancing the bottles, a plurality of rocking fingers pivotally carried adjacent their rear ends and having spaced front ends for receiving the bottles between their front ends, whereby said fingers will receive the necks of the bottles and allow the bottles to rock upon said fingers and into upright position as the fingers rock upwardly, a platform for receiving the upright bottles from said fingers, and a laterally sliding finger for engaging the bottles upon the platform and sliding them along such platform.

5. In a machine for handling bottles, the combination of a conveyor for advancing the bottles and holding them in an inverted position, a plurality of rocking fingers pivotally mounted adjacent their rear ends and having spaced front ends for receiving the necks of the bottles adjacent their front ends, means for rocking said fingers upwardly to cause said bottles when elevated by said fingers to rock over into an upright position with their bases towards the pivoted ends of said fingers, a platform for receiving the upright bottles, a back stop against which said bottles are placed by said rocking fingers, a transverse slide having an outwardly projecting finger for engaging said bottles while they rest upon said platform, and means for reciprocating said slide.

6. In a machine for handling bottles, the combination of a conveyor for advancing the bottles and holding them in an inverted position, a plurality of rocking fingers pivotally mounted adjacent their rear ends and having spaced front ends for receiving the necks of the bottles adjacent their front ends, means for rocking said fingers upwardly to cause said bottles when elevated by said fingers to rock over into an upright position with their bases towards the pivoted ends of said fingers, a platform for receiving the upright bottles, and an adjustable and rearwardly yielding back stop against which said bottles are placed by said rocking fingers, a transverse slide having an outwardly projecting finger for engaging said bottles while they rest upon said platform, and means for reciprocating said slide.

7. In a machine for handling bottles, the combination of a conveyor for advancing the bottles and holding them in inverted position, a plurality of rocking fingers pivotally mounted adjacent their rear ends and having spaced front ends for receiving the necks of the bottles between their front ends when said bottles are advanced by said conveyor, means for rocking said fingers upwardly to cause said bottles to rock over into an upright position with their bases presented towards the pivoted ends of said fingers, means against which the bases of the bottles strike, and means for receiving the upright bottles as they are discharged from said fingers.

8. In a machine for handling bottles, the combination of a conveyor for advancing the bottles and holding them in inverted position, a plurality of rocking fingers pivotally mounted adjacent their rear ends and having spaced front ends for receiving the necks of the bottles between their front ends when said bottles are advanced by said conveyor, means for rocking said fingers upwardly to cause said bottle to rock over into an upright position with their bases presented towards the pivoted ends of said fingers, stops against which the bases of the bottles strike, a platform adapted to receive the upright bottles as they are discharged from said fingers, an adjustable and rearwardly yielding back stop mounted above said platform and against which the bottles are urged by said rocking fingers, a slide extending transversely across said conveyor and above said platform, a finger projecting from said slide for engaging the bottles while they rest upon the platform, and means for reciprocating said slide to discharge the bottles from said platform.

9. In a machine for handling bottles, the combination of a conveyor for advancing the bottles and holding them in an inverted position, a plurality of rocking fingers pivotally mounted adjacent their rear ends and having spaced front ends for receiving the necks of the bottles adjacent their front ends, means for rocking said fingers upwardly to cause said bottles, when elevated by said fingers, to rock into an upright position with their bases towards the pivoted ends of said fingers, said elevating means causing a dwell between the initiation and the finish of the elevating stroke of the fingers to permit a free rocking of the bottles, and said fingers having a constricted space between them with a flared space on opposite sides of the constricted space, and a table for receiving the upright bottles.

In testimony that I claim the foregoing I have hereunto set my hand at Milwaukee, in the county of Milwaukee and State of Wisconsin.

JOHN R. DOSTAL.